(12) United States Patent
Bernstein

(10) Patent No.: US 7,038,829 B2
(45) Date of Patent: May 2, 2006

(54) MAGNETIC DAMPING FOR MEMS ROTATIONAL DEVICES

(75) Inventor: Jonathan Jay Bernstein, Medfield, MA (US)

(73) Assignee: Corning, Corning, NY (US)

( * ) Notice: Subject to any disclaimer, the term of this patent is extended or adjusted under 35 U.S.C. 154(b) by 152 days.

(21) Appl. No.: 10/254,360

(22) Filed: Sep. 25, 2002

(65) Prior Publication Data

US 2004/0057103 A1 Mar. 25, 2004

(51) Int. Cl.
*G02B 26/00* (2006.01)

(52) U.S. Cl. ............... 359/290; 359/291; 359/196

(58) Field of Classification Search ........ 359/290, 359/291, 280, 849, 862, 196; 105/193; 310/90.5, 310/103, 51; 248/562, 636
See application file for complete search history.

(56) References Cited

U.S. PATENT DOCUMENTS

| | | | | |
|---|---|---|---|---|
| 4,585,282 A | * | 4/1986 | Bosley | 310/90.5 |
| 4,629,317 A | * | 12/1986 | January et al. | 356/155 |
| 5,434,462 A | * | 7/1995 | Leupold et al. | 310/178 |
| 5,736,798 A | * | 4/1998 | O'Brien et al. | 310/51 |
| 5,892,159 A | * | 4/1999 | Smith | 73/861.354 |
| 5,995,688 A | * | 11/1999 | Aksyuk et al. | 385/14 |
| 6,480,645 B1 | * | 11/2002 | Peale et al. | 385/18 |
| 6,831,461 B1 | * | 12/2004 | Arz et al. | 324/318 |
| 2002/0106314 A1 | * | 8/2002 | Pelrine et al. | 422/186 |
| 2003/0234711 A1 | * | 12/2003 | Bernstein et al. | 335/296 |

OTHER PUBLICATIONS

Entitled, *Apparatus, Device and Method for Generating Magnetic Field Gradient*, U.S. Appl. No. 10/180,013, filed Jun. 25, 2002, assigned to Corning Inc.
Entitled, *Magnetically Actuated Micro-Electro-Mechanical Apparatus and Method of Manufacture*, U.S. Appl. No.

(Continued)

*Primary Examiner*—Timothy Thompson
*Assistant Examiner*—Brandi Thomas
(74) *Attorney, Agent, or Firm*—Joanne N. Pappas

(57) ABSTRACT

The effectiveness of magnetic damping on a MEMS device rotating in a high magnetic field or field gradient is described and analyzed for three preferred embodiments: (1) a conductive plate rotating about a single axis in a uniform magnetic field; (2) a conductive plate rotating about two axes in a high magnetic field gradient region; and (3) a conductive rectangular plate rotating in a magnetic field. Control of a rotational MEMS device such as a mirror necessitates fast response and settling times. Optimal response is achieved by reducing the mechanical quality factor (Q) close to one (1). Magnetic damping is found to be an effective means of reducing the Q factor of MEMS rotating mirrors without introducing hysteresis, narrow gaps or fluids. Methods to reduce the Q factor include reducing mirror mass and moment of inertia, increasing the conductive layer thickness, and increasing $$\frac{\partial \phi}{\partial \theta}$$

or magnetic flux density variation as a function of angle.

40 Claims, 13 Drawing Sheets

OTHER PUBLICATIONS

09/939,422, filed Aug. 24, 2001, assigned to Corning IntelliSense Corporation.

Duwel, A.; Weinstein, M.; Gorman, J.; Borenstein, J.; Ward, P. *Quality Factors of MEMS Gyros and the Role of Thermoelastic Damping* International Conference on Micro Electro Mechanical Systems (MEMS). 15th. Held in Las Vegas, NV, Jan. 20, 2002 to Jan. 25, 2002. Sponsored by: IEEE. pp. 214-219. (Draper Report No. P-3935).

Chaudhuri, Bidhan; Fischer, Kevin; Guckel, Henry *A Magnetically Damped Momentum Transfer Device to Reduce Chatter in a Micro-Mechanical Switch* 0-7803-5998-Apr. 2001 IEEE 2001, pp. 265-268.

* cited by examiner

MAGNETIC DAMPING FOR MEMS ROTATIONAL DEVICES

FIELD OF THE INVENTION

This invention relates to magnetic damping, and in particular to magnetic damping of MEMS rotational devices.

BACKGROUND OF THE INVENTION

Damping has been identified as an important principle for micromechanical devices to help reduce errors and speed settling while improving stability. Micromechanical devices can be fabricated with purely elastic supports, resulting in a classic spring-mass-damper system. In many microelectromechanical (MEMS) systems, the primary source of damping is air damping, which may be insufficient with systems with relatively large air gaps. Under-damped MEMS can lead to long settling times and make closed loop control challenging. The introduction of fluids can lead to over-damped MEMS.

Several known damping mechanisms exist such as fluid damping and mechanical friction. Prior art solutions to perfect damping in MEMS mirrors have used soft metals, such as gold, on the springs or the supports, while other solutions have used other soft or plastic materials on the springs. However, these prior art solutions typically cause hysteresis, an undesirable result bringing about uncertainty of the MEMS angular position.

Another prior art solution, described in "A Magnetically Damped Momentum Transfer Device to Reduce Chatter in a Micro-Mechanical Switch" 0-7803-5998-4/01 IEEE 2001, pages 265–268, a switch is described where the bounce after contact is reduced by using magnetic damping to reduce linear momentum while maintaining high contact forces. However, this prior art solution presents no viable solution for a rotating MEMS device.

In the control of a rotational MEMS device such as a mirror, it is desirable to have a fast response time and a fast settling time. The optimal response is generally achieved by reducing the mechanical Q factor such that it is close to one (1). Many MEMS devices do not have sufficient air damping to achieve a low Q, hence there is a need for a method to introduce additional damping without adding hysteresis or fluids.

Fluids can contaminate a MEMS device and add to the cost and complexity of packaging. Furthermore, variations in fluid properties can defocus an optical beam and cause insertion loss.

A need exists for a method and apparatus for magnetic damping as a means of reducing the Q of MEMS rotating mirrors without introducing hysteresis, narrow gaps or fluids.

SUMMARY OF THE INVENTION

One aspect of a preferred embodiment of the present invention relates to a device for magnetic damping including at least one conductive plate having a conductive layer, the plate capable of rotating in an applied magnetic field. In another aspect, the invention includes the conductive plate as a MEMS mirror; the conductive plate being round; the majority of said conductive plate being conductive; and the conductive plate rotating around a pair of flexures that support the plate. Another aspect of the present invention relates to a thickness of the mirror in the range of 1 to 1000 microns; a radius of said mirror in the range of 0.01 mm to 2.0 mm; the magnetic field in the range of 0.1 Tesla to 1.5 Tesla; the conductive layer thickness in the range of 1 micron to 1000 microns; and a resulting mechanical quality factor (Q) of the mirror in the range of 0.1 to 30.

One aspect of another preferred embodiment of the present invention relates to a device for magnetic damping including a magnet producing a magnetic field and at least one conductive plate capable of rotating about two axes in the magnetic field. In another aspect, the invention includes each of the at least one conductive plates is a MEMS mirror; each of the at least one conductive plates is a round mirror; each of the at least one conductive plates has a conductive layer; and the majority of each of the at least one conductive plates being conductive. In another aspect, the invention includes a monolithic magnet with protruding nubs. In another aspect, the invention includes a monolithic magnet with filled holes. Another aspect of the invention relates to a thickness of the mirror in the range of 1 to 1000 microns; a radius of the mirror in the range of 0.01 mm to 2.00 mm; the magnetic field in the range of 0.1 to 1.5 Tesla per meter; the conductive layer thickness in the range of 1 to 1000 microns; and a mechanical quality factor (Q) of the mirror less than 2.

One aspect of yet another preferred embodiment of the present invention relates to a device for magnetic damping including a magnet producing a magnetic field and at least one conductive plate having a conductive layer capable of rotating about a single axis in the magnetic field. In another aspect, the invention includes the at least one conductive plates is a MEMS mirror; the mirror has a rectangular shape; the mirror is a double-ended paddle mirror with actuation coils and hinges; the majority of the at least one conductive plates is conductive. Another aspect of the invention relates to the conductive layer having a thickness in the range of 0.001 mm to 1.0 mm; the conductive layer and actuation coils on one end of the double-ended paddle; a thickness of the mirror in the range of 0.001 mm to 1.0 mm; a length of the mirror in the range of 0.05 mm to 4.00 mm; a width of the mirror in the range of 0.005 mm to 1.00 mm; the magnetic field in the range of 0.1 Tesla to 1.5 Tesla; and a resulting mechanical quality factor (Q) of the mirror in the range of 0.1 to 30.

One aspect of still yet another preferred embodiment of the present invention relates to a method for increasing magnetic damping of a MEMS rotational device including the steps of placing a conductive layer on at least one conductive plate and applying a magnetic field to the at least one conductive plate, the at least one conductive plate capable of rotation in the magnetic field.

In another aspect, the invention relates to the conductive layer having a thickness in the range of 1 to 1000 microns; the conductive layer being made of copper; the at least one conductive plate is a MEMS mirror. In one aspect, the invention relates to a round mirror. In another aspect the mirror is rectangular. In another aspect, the invention relates to a method where a resulting mechanical quality factor (Q) is in the range of 0.1 to 30.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed. As will be realized, the invention is capable of other and different embodiments and its several details may be capable of modifications in various respects, all without departing from the invention.

The accompanying drawings are included to provide a further understanding of the invention, and are incorporated in and constitute a part of this specification. The drawings illustrate one or more embodiment(s) of the invention, and together with the description serve to explain the principles and operation of the invention.

Accordingly, the drawings and description are to be regarded as illustrative in nature and not in a restrictive or limiting sense with the scope of the application being indicated in the claims.

BRIEF DESCRIPTION OF THE DRAWINGS

This invention is further illustrated with reference to the following drawings in which.

DETAILED DESCRIPTION OF THE PREFERRED EMBODIMENT

Reference will now be made in detail to the present preferred embodiments of the invention, examples of which are illustrated in the accompanying drawings. Wherever possible, the same reference numbers will be used throughout the drawings to refer to the same or like parts.

Several preferred embodiments of the present invention showing the effectiveness of magnetic damping for the plate rotating in a high magnetic field gradient will be described and analyzed infra as follows: (1) a conductive plate rotating about a single axis in a uniform magnetic field; (2) a conductive plate rotating about two axes in a high magnetic field gradient region; and (3) a conductive rectangular plate rotating in a magnetic field.

Plate Rotating about a Single Axis in a Uniform Magnetic Field

Figure 1:
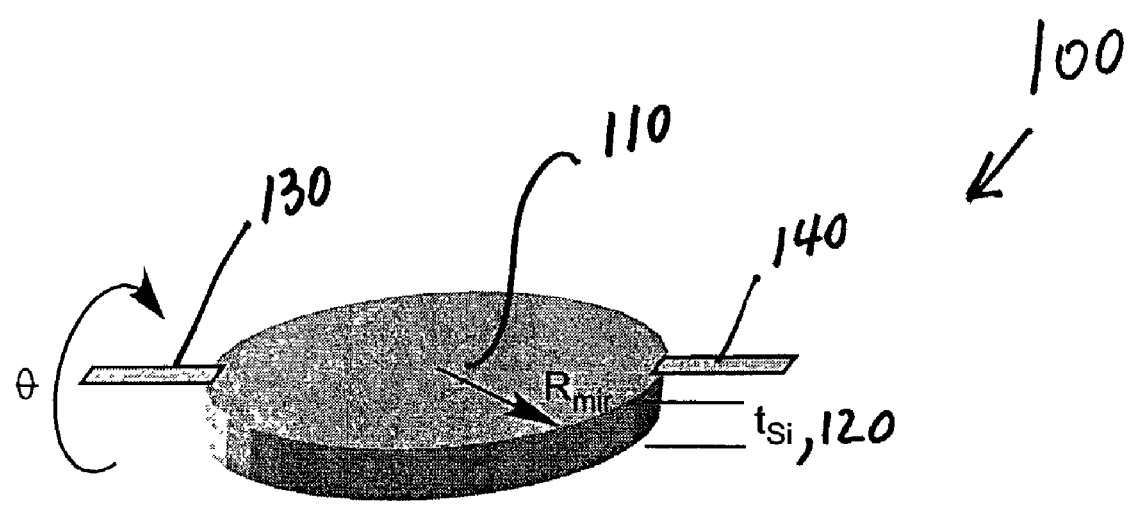
FIG. 1 shows a circular conductive plate on torsional springs in accordance with a preferred embodiment of the present invention.

Referring now to FIG. 1 a circular mirror 100 is shown in accordance with a preferred embodiment of the present invention having a radius $R_{mir}$ 110 and a thickness $t_{Si}$ 120. Circular mirror 100 rotates around two flexures 130 and 140, the flexures being coplanar with one surface of the mirror 100. The thickness $t_{Si}$ 120 of the mirror 100 is in the range of 1 to 1000 microns and the radius $R_{mir}$ 110 of the mirror 100 is in the range of 0.01 to 2.0 mm in accordance with a preferred embodiment of the present invention.

Figure 2:
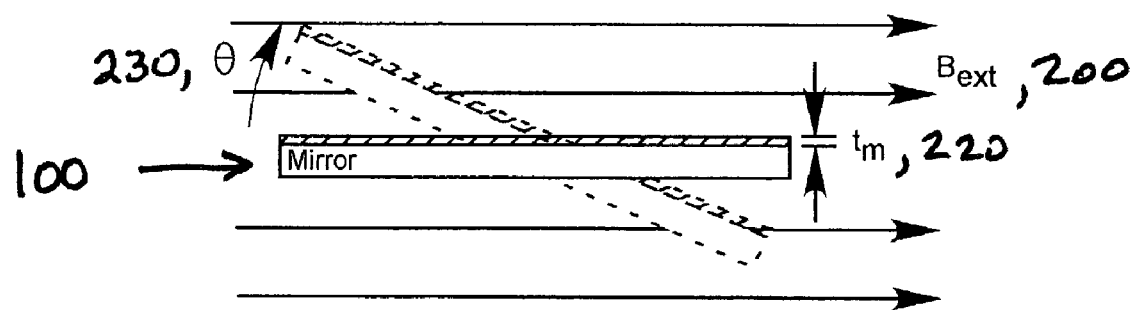
FIG. 2 shows the mirror of FIG. 1 rotating in a magnetic field.

Referring now to FIG. 2 an in-plane magnetic field of strength $B_{ext}$ 200 applied to the mirror 100 of FIG. 1 is shown. This type of configuration with at least one conductive plate is suitable for damping a single axis of rotation. In-plane magnetic field of strength $B_{ext}$ 200 is in the range of 0.1 to 1.5 Tesla in accordance with a preferred embodiment of the present invention.

In accordance with the present invention and for ease of analysis, circular mirror 100 is assumed to be perfectly round having a uniform conductive layer (a metal such as copper) of thickness $t_m$ 220 on one side. Thickness $t_m$ 220 is in the range of 1 to 1000 microns in accordance with a preferred embodiment of the present invention. In accordance with another aspect of the preferred embodiment of the present invention, the majority of the conductive plate or mirror 100 is conductive.

It may be desirable for symmetry to have this conductive layer 220 on both sides of the mirror 100 to reduce thermal stress induced mirror curvature (not shown). It is also assumed that the conductive layer 220 is thin enough and the frequency $\omega_0$ of motion of the mirror 100 is low enough that the magnetic field 200 penetrates through the entire conductive layer 220, i.e. the skin depth is much greater than thickness $t_m$ 220.

For this type of embodiment, in determining the Q factor, the effective magnetic field penetrating the mirror 100 shown in FIG. 1 is represented by the following equation (1) for $B_{eff}$:

$$B_{eff}=B_{ext}\sin(\theta(t))=B_{ext}\sin(\theta_{max}\sin(\omega_0 t))=B_{ext}\sin(\theta(t)) \qquad 1.$$

Assuming the mirror is rotating sinusoidally at its resonant frequency, then angle θ 230 is represented by the following equation (2):

$$\theta=\theta_{max}\sin(\omega_0 t) \qquad 2.$$

The changing magnetic field induces currents to flow in circles in the conductive layer. The rate of change of the magnetic field is represented by the following equation:

$$3.\ \dot{B}=\frac{\partial B_{eff}}{\partial t}=B_{ext}\theta_{max}\omega_0\cos(\omega_0 t)\cos(\theta(t))$$

In accordance with the analysis of the present embodiment, assuming that θ is very small allows cos(θ) to be replaced by 1. This is a reasonable assumption in accordance with the present invention since for optical switches the angles required are on the order of 10°.

Figure 3:
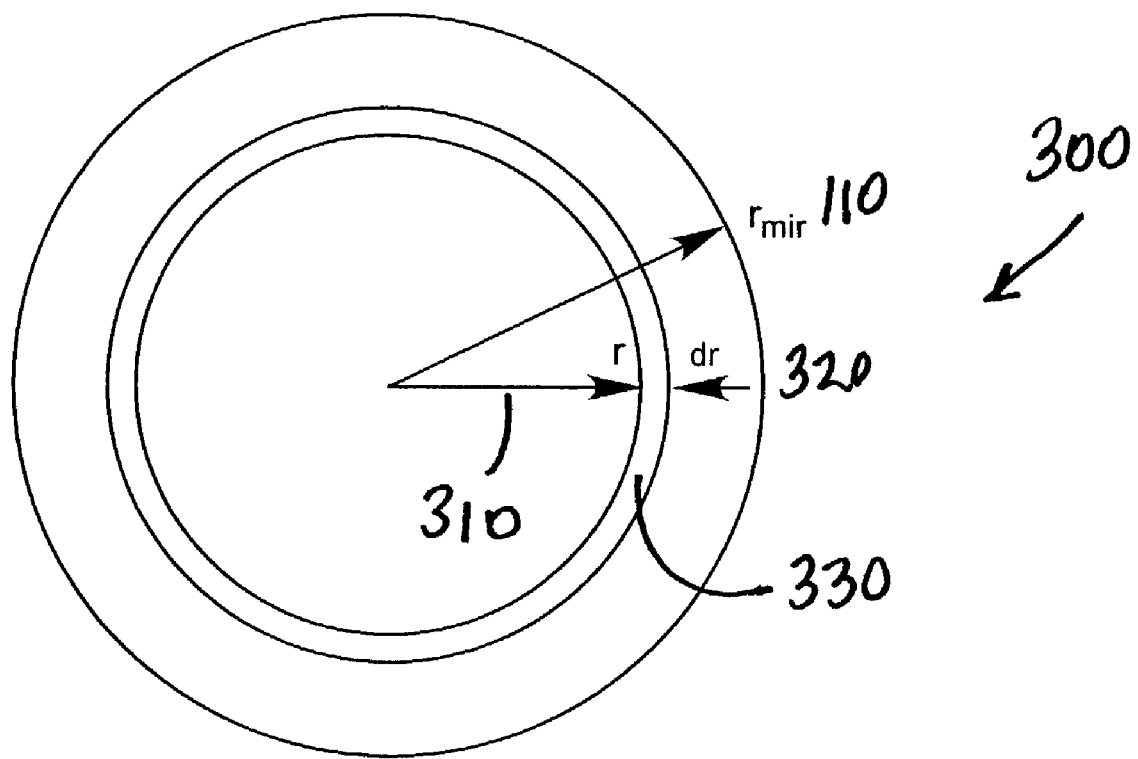
FIG. 3 shows a top view of the mirror of FIG. 1 in a time varying magnetic field.

To calculate the power dissipated in a circular conductive plate with a uniform time varying magnetic field, an annular region 330 between r 310 and r 310+dr 320, is considered as indicated in FIG. 3.

The resistance of this annular region 330 of resistivity $\rho_m$ and thickness $t_m$ 220 is calculated using the following equation (4):

$$4.\ R(r) = \frac{\rho_m(2\pi r)}{dr \cdot t_m}$$

The voltage induced by the changing field around the loop or annular region 330 is represented by the following equation (5) where $\phi$ is the magnetic flux inside the loop and $\dot{B}$ is the rate of change of the effective magnetic field:

$$5.\ V = \frac{\partial \phi}{\partial t} = (\pi r^2)\dot{B}$$

The power dissipated in the annulus is calculated using the following equation (6):

$$6.\ dP = \frac{V^2}{R} = \left[\frac{(\dot{B})^2 \pi \cdot t_m}{2\rho_m}\right] \cdot r^3 dr$$

Integrating this from zero to $r_{mir}$ gives the total power dissipated as defined below in equation (7):

$$7.\ P = \frac{\dot{B}^2 \pi \cdot t_m r_{mir}^4}{8\rho_m}$$

The moment of inertia I of a right circular cylinder of density $\rho$, height a and radius r about an axis lying in one of the faces of the mirror device (the flexures being coplanar with one face) is defined by equation (8) below:

$$8.\ I = \pi r^2 \rho a \left[\frac{r^2}{4} + \frac{a^2}{3}\right]$$

The equation of motion for a rotational spring-mass-damper system is defined in equation (9) as follows:

$$I\ddot{\theta} = \Sigma \tau_{ext} - b\dot{\theta} - k_\theta \theta \qquad 9.$$

where b (also called $R_\theta$) is the rotational damping coefficient and $k_\theta$ is the rotational spring constant. When external torques are set to zero, the resonant frequency is given by the following equation (10):

$$10.\ \omega_0 = \sqrt{\frac{k_\theta}{I}}$$

Thus, the mechanical Q is given by the following equation (11):

$$11.\ Q_m = \frac{\omega_0 I}{b}$$

The power dissipated by the linear damping coefficient b is proportional to the rotational velocity and the damping torque as given by equation (12):

$$P_D = \dot{\theta}\tau_D = b\dot{\theta}^2 \qquad 12.$$

Hence, the rotational damping coefficient can be extracted from equations (7) and (3) as follows in equation (13):

$$13.\ b = \frac{P_D}{\dot{\theta}^2} = \frac{B_{ext}^2 \pi \cdot t_m r_{mir}^4}{8\rho_m}$$

Referring now to TABLE 1, sample variable values used for calculation of Q is shown in accordance with the preferred embodiment of the present invention. The resulting Q value is 1.7 as shown in TABLE 1 below. In accordance with the preferred embodiment of the present invention, the Q of the mirror 100 described supra can be in the range of 0.1 to 30 (unitless).

TABLE 1

Values utilized in calculating damping and the mechanical quality factor (Q) in accordance with the preferred embodiment of the present invention

| Variable | Value | Description | Ranges |
| --- | --- | --- | --- |
| $\omega_0$ | $2\pi$ 80 Hz | Mirror resonant frequency | Design specific |
| $t_{Si}$ | 50 μm | Thickness of mirror | 1–1000 microns |
| $r_{mir}$ | 0.65 mm | Radius of mirror | 0.1–2.0 mm |
| $\rho_m$ (Cu) | $1.6 \times 10^{-6}$ Ω-cm | Electrical resistivity of Cu | Physical constant |
| $B_{ext}$ | 0.6 T | External magnetic field | 0.1 to 1.5 Tesla |
| $t_m$ | 3.0 μm | Damping metal thickness | 1–1000 microns |
| $\rho$ (Si) | $2.3 \times 10^3$ kg/m$^3$ | Density of silicon | Design specific |
| Q | 1.7 | Mechanical quality factor | 0.1 to 30 (unitless) |

Figure 4:
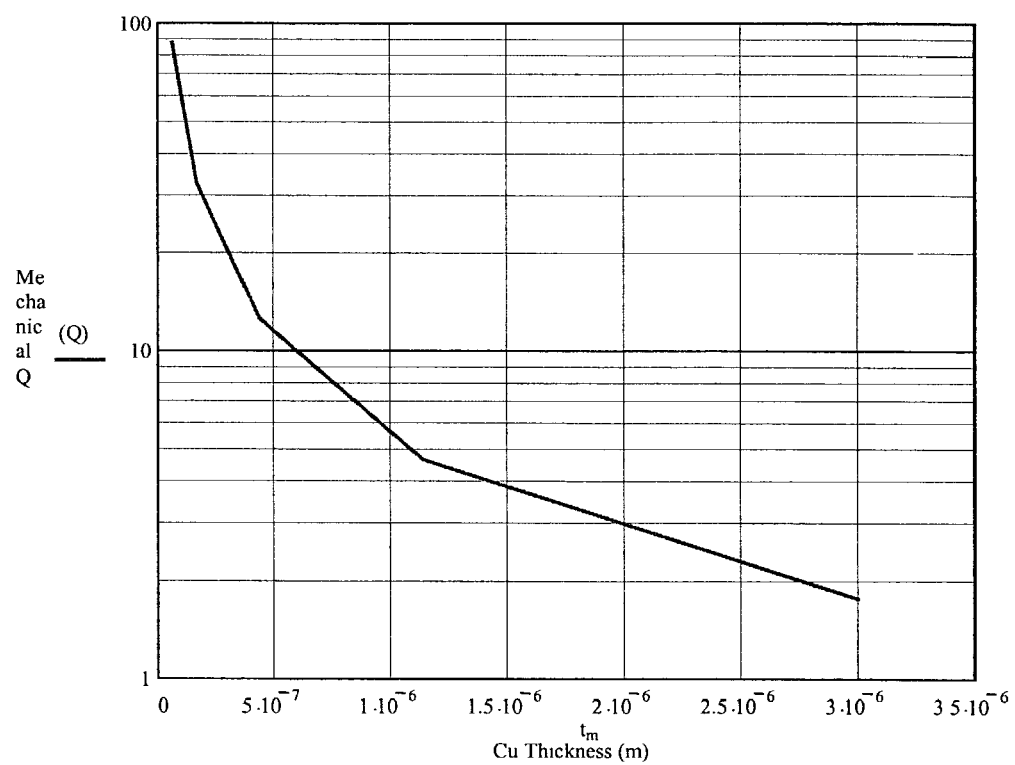
FIG. 4 shows a plot of Q versus Cu layer thickness varying from 600 Å to 3 μm.

Referring to FIG. 4, a plot 400 of Q versus metal layer thickness 220 for a copper layer that varies from 600 Å to 3 μm in thickness is shown in accordance with the preferred embodiment of the present invention. This plot signifies how greatly the Q is reduced by the addition of the conductive layer and the magnetic field.

Plate Rotating about Two Axes in a High Magnetic Field Gradient

In an alternate preferred embodiment of the present invention, a strong magnetic field gradient at a conductive plate permits damping of two orthogonal axes of rotation. As will be described infra, the eddy currents and damping of a mirror in this magnetic field are somewhat different from those that arise when a conductive plate rotates in a uniform magnetic field as was described supra.

Figure 5:
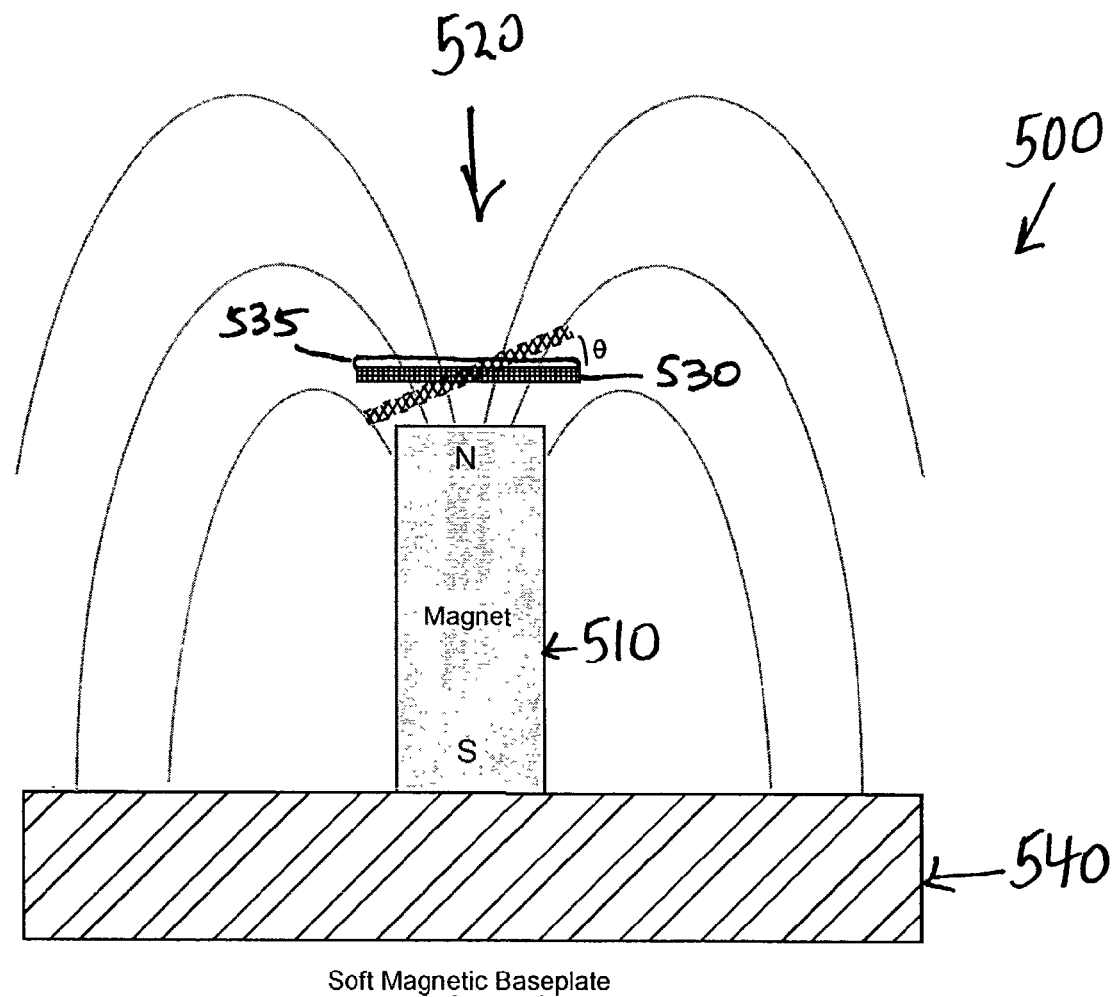
FIG. 5 shows a conductive plate rotating in a high magnetic field gradient induced by a permanent magnet in accordance with a preferred embodiment of the present invention.

Referring now to FIG. 5, an arrangement 500 that includes magnet 510 with a strong field gradient region 520 in the range of 100 to 15,000 Tesla per meter at the end and a conductive plate such as a MEMS mirror 530 of thickness in the range of 1 to 1000 microns and radius of 0.01 to 2.00 mm in the strong field gradient region 520 in accordance with a preferred embodiment of the present invention is shown. The conductive layer thickness 535 of mirror 530 is in the range of 1 to 1000 microns in accordance with the preferred embodiment of the present invention. In accordance with another aspect of the preferred embodiment of the present invention, the majority of the conductive plate or mirror 530 is conductive.

Also shown is a soft magnetic base plate 540. If the plate 530 rotates, one half of the mirror 530 moves towards the magnet 510, resulting in an increasing magnetic flux density variation, and one half moves away from the magnet, resulting in a decrease in flux density.

Figure 6:
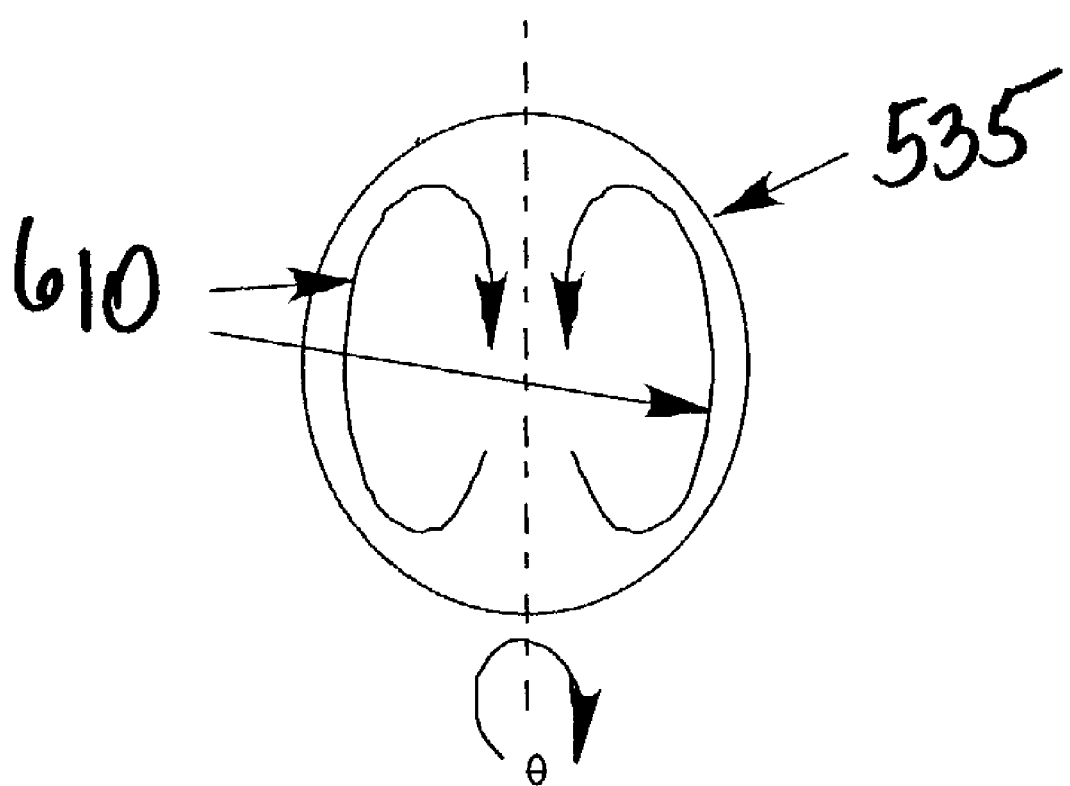
FIG. 6 shows eddy currents induced by rotation of the conductive plate of FIG. 5 in the field gradient region.

This changing field induces eddy currents 610 as shown in FIG. 6. The flow of these eddy currents 610 induced by the changing flux density resists motion of the mirror and results in damping. The analysis of damping in this case is somewhat more complicated than that in a uniform field as will be described infra. Finite Element Analysis [FEA] techniques can also be utilized to analyze the damping in this embodiment.

In the present preferred embodiment, although the uniform magnetic field only permits damping in one axis of rotation, the field gradient magnets dampen both axes of rotation of the mirrors. This technique for 2-axis damping can be extended to an array of mirrors by using a magnet array that creates an array of high field gradient regions.

Analysis of this embodiment is similar to the uniform field case described supra, except in this analysis the two halves are treated separately. The flux coupling through one half of the plate is represented by φ. The average resistance seen by the current circulating in each half of the plate is denoted by R. The voltage induced around a loop in each half is represented by the equation (14) below:

$$14.\ V = \frac{\partial \phi}{\partial t} = \frac{\partial \phi}{\partial \theta}\dot{\theta}$$

The power dissipated in both halves is characterized by the following equation (15):

$$15.\ P = \frac{2\dot{\theta}^2\left(\frac{\partial \phi}{\partial \theta}\right)^2}{R} = R_\theta \dot{\theta}^2$$

where $R_\theta$ (also denoted by b previously) characterizes the rotational damping coefficient.

Figure 7:
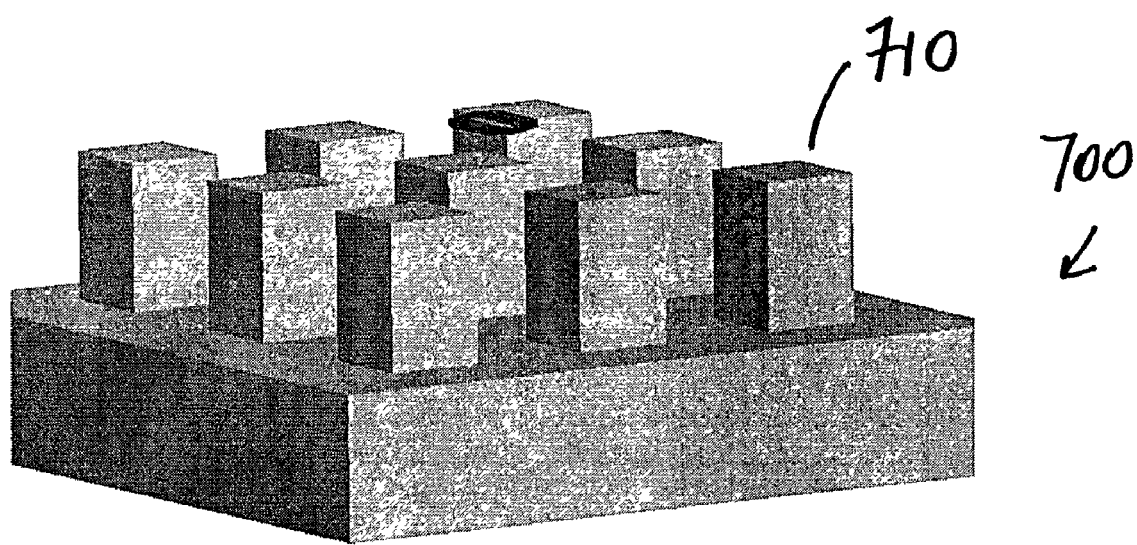
FIG. 7 shows a monolithic magnet with protruding nubs used with the conductive plate in FIG. 5 in accordance with a preferred embodiment of the present invention.

In this demonstration, the damping coefficient is calculated by FEA techniques using a particular magnet configuration 700 with protruding nubs 710, as shown in FIG. 7. Similarly, a magnet configuration with filled holes is also contemplated in the present invention (not shown in FIG. 7).

These and other magnet configurations and additional elements of the configurations are described in further detail in pending U.S. patent application Ser. No. 10/180,013, assigned to Assignee hereof, entitled, APPARATUS, DEVICE AND METHOD FOR GENERATING MAGNETIC FIELD GRADIENT, filed on Jun. 25, 2002, and incorporated by reference herein.

A Q of 43 is predicted when there is a 2 micron copper layer on the mirror with magnet configuration including nubs 810. However, measured results show a Q as low as 9 using a checkerboard magnet configuration without nubs 710 shown in FIG. 7. Further, a Q as low as 2 is predicted using a filled hole magnet configuration when there is a 30 micron mirror thickness, a 5 micron copper layer thickness and thinner silicon used. Some of these results are tabulated in TABLE 2. Advanced magnet configurations with extremely high field gradients including but not limited to that shown in FIG. 7 should produce even more improved damping results.

In general, a larger uninterrupted region for current flow results in higher power dissipation, and the rotation in the region of strong field gradient 520 divides the conductor into two effective current paths which explains why the Q is larger than the case involving a uniform field.

Figure 8:
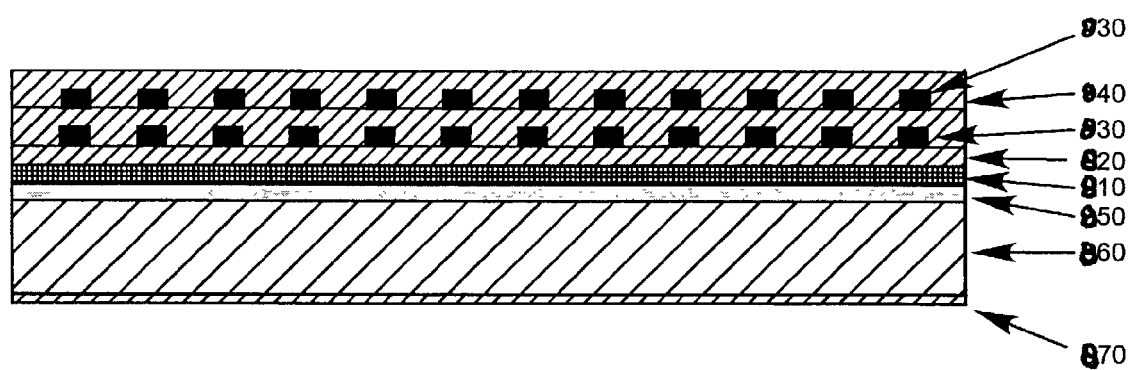
FIG. 8 shows a side view of additional conductive layers beneath coils in accordance with a preferred embodiment of the present invention.

Referring now to FIG. 8 a device 800 is shown in accordance with the preferred embodiment of the present invention to include fabrication by adding a 2 micron thick Cu conductive layer 810 and an extra polyimide layer 820 (to avoid shorting the coils) to a standard mirror process.

This standard process includes a structural silicon layer 860, a reflective layer 870, two Au coil layers 830, insulating layers 820, 840, and 850, and is described in further detail in pending U.S. patent application Ser. No. 09/939,422, entitled, MAGNETICALLY ACTUATED MICRO-ELECTRO-MECHANICAL APPARATUS AND METHOD OF MANUFACTURE, Ser. No. 09/939,422, filed on Aug. 24, 2001, assigned to Corning IntelliSense Corporation, a wholly owned subsidiary of Assignee hereof and incorporated herein by reference.

Q can be measured for devices with and without the Cu conductive layer by the ring-down method where a small voltage pulse can be applied to start the mirrors ringing and a laser vibrometer can read out the mirror velocity as a function of time.

Figure 9:
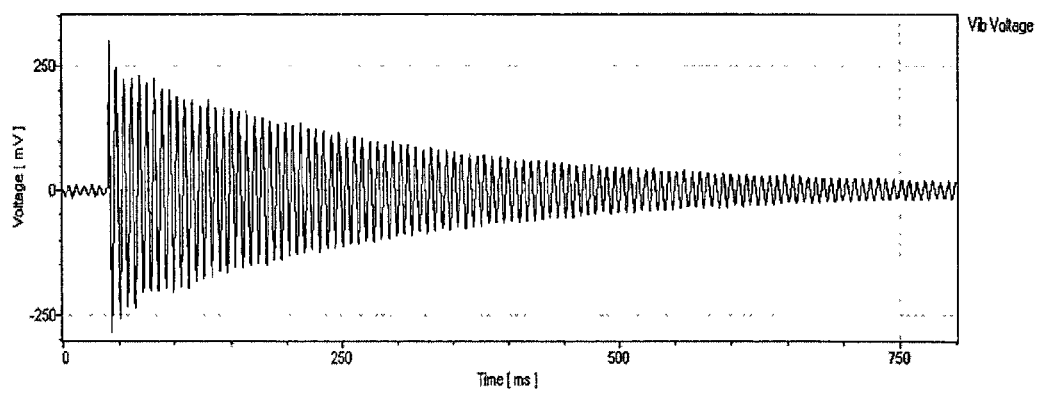
FIG. 9 shows the ringdown for a mirror with no conductive damping layer.

Referring now to FIG. 9 the ringdown for a mirror with no conductive damping layer is shown. Hence, damping in this device is primarily due to air damping between the mirror and the magnets. Since this gap is large (on the order of 300 microns), little damping is achieved as is shown in FIG. 9 by the large number of cycles before amplitude is reduced. The Q of this type of mirror is 30 as depicted in TABLE 2.

Figure 10:
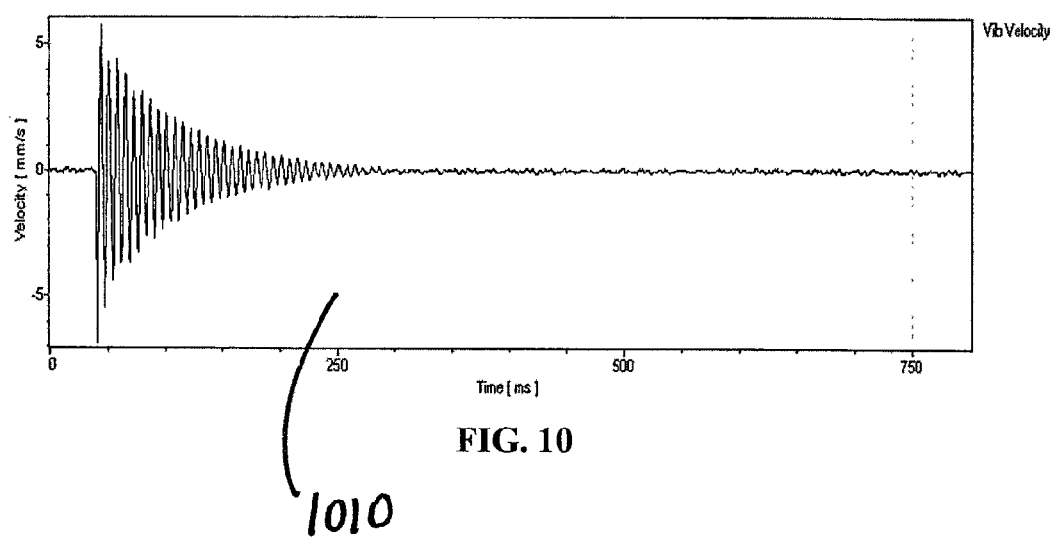
FIG. 10 shows the ringdown for a mirror with a conductive damping layer in accordance with the present invention.

On the contrary, referring now to FIG. 10 the ring-down for a mirror with a 2 micron Cu conductive layer added is shown in accordance with a result of the preferred embodiment of the present invention.

The ringdown 1010 is markedly shorter at 250 ms, indicating that the magnetic damping is having the desired effect. The Q of this type of mirror is 9 as depicted in TABLE 2.

TABLE 2

Values utilized in calculating damping and the mechanical quality factor (Q) in accordance with a preferred embodiment of the present invention

| Magnets | Checkerboard Embodiment | Checkerboard Embodiment | Filled Hole Embodiment | Ranges |
|---|---|---|---|---|
| Cu thickness | No Cu | 2 μm Cu | 5 μm Cu, Thinner Si | 1–1000 microns |
| Mirror Thickness | 50 μm | 50 μm | 30 μm | 1–1000 microns |
| Mirror Radius | 0.65 mm | 0.65 mm | 0.65 mm | 0.01–2.00 mm |
| Q | 30 (measured) | 9 (measured) | 2 (predicted) | 2 (predicted) |

It should be noted that while the data shown in FIG. 10 are specific to the preferred embodiment involving a plate rotating about two axes in a high magnetic field gradient in accordance with the present invention as discussed supra, the ring-down of a device with a conductive layer would generally extend to and have similar desired effects for a preferred embodiment of the present invention involving a plate rotating about a single axis in a uniform magnetic field as discussed supra or a rectangular plate rotating in a magnetic field as will be discussed infra.

Conductive Rectangular Plate Rotating about a Single Axis in a Magnetic Field

Many devices, such as photonic switching mirror arrays, require an array of rectangular mirrors rotating about a single axis. Magnetic damping can be used to add linear non-contact, non-hysteretic damping to such configurations.

Figure 11:
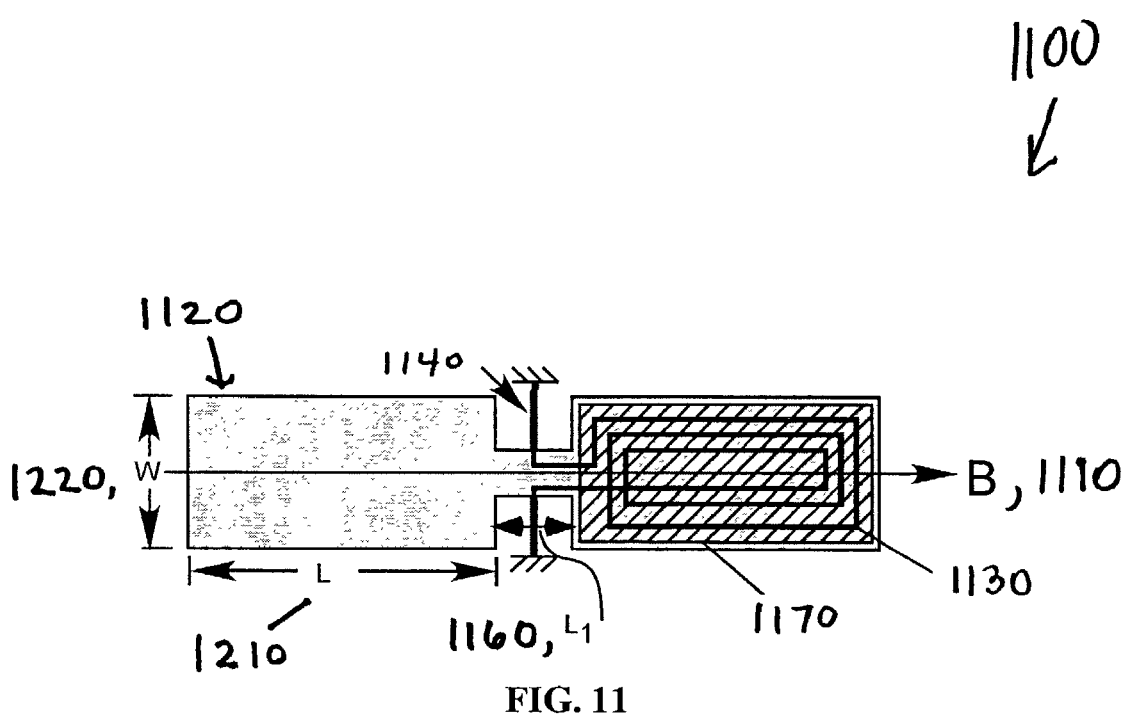
FIG. 11 shows a double-paddle shaped mirror in accordance with another preferred embodiment of the present invention.

Referring now to FIG. 11 a typical mirror 1100 in accordance with another preferred embodiment of the present invention is shown. The magnetic field B 1110 is assumed constant and parallel to the long axis and in the range of 0.1 to 2.0 Tesla or 0.1 to 1.5 Tesla/radian. The mirror 1100 is shown as a double-ended or double-sided paddle with a mirror 1120 on one end, actuation coils 1130 on the other, and torsional hinges 1140 in the center. The rectangular mirror 1100 has a thickness in the range of 0.001 to 1.0 mm (not shown), with a length L 1210 in the range of 0.05 to 4.0 mm (shown in FIGS. 11 and 12), a width W 1220 in the range of 0.005 to 1.000 mm (shown in FIGS. 11 and 12), and a gap L1 1160 in the range of 0.050 to 2.0 mm in accordance with the preferred embodiment of the present invention. These and other variable values are tabulated in TABLE 3 below in accordance with the preferred embodiment of the present invention.

For the analysis of this preferred embodiment in accordance with the present invention it shall be assumed that the conductive damping layer 1170 (and coils 1130) are only on one side of the hinges 1140 to avoid warping the mirror 1120 side. Analysis of the layer on both sides, though possible, is not described herein. The conductive layer 1170 thickness is in the range of 0.001 to 1.0 mm in accordance with the preferred embodiment of the present invention. In accordance with another aspect of the preferred embodiment of the present invention, the majority of the conductive plate or mirror 1100 is conductive.

Figure 12:
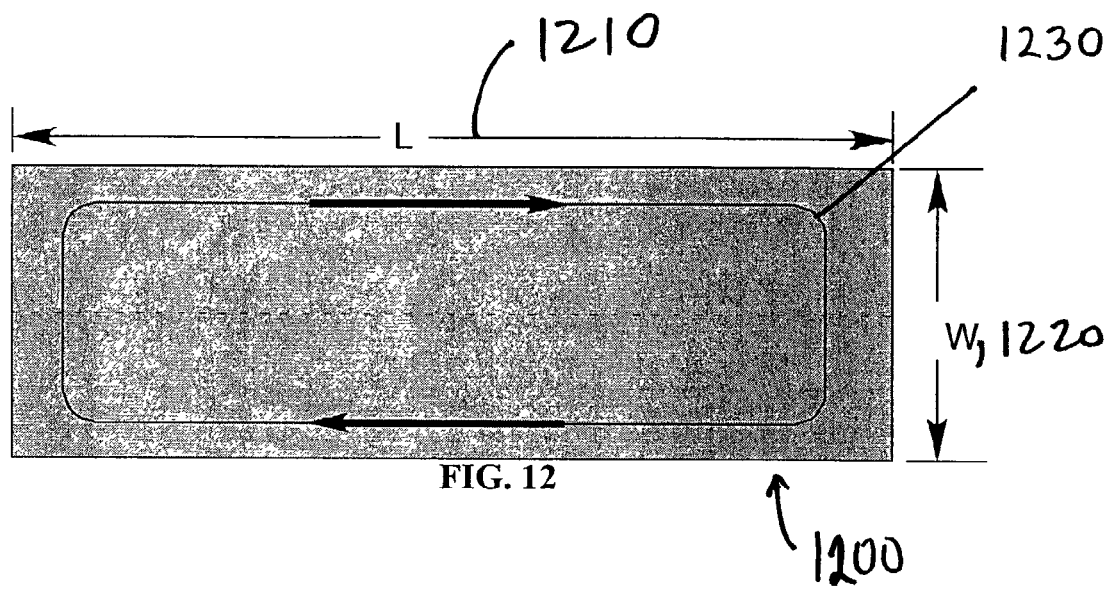
FIG. 12 shows the conductive path assumed on the mirror of FIG. 11 in accordance with analysis of the present invention.
Figure 13:
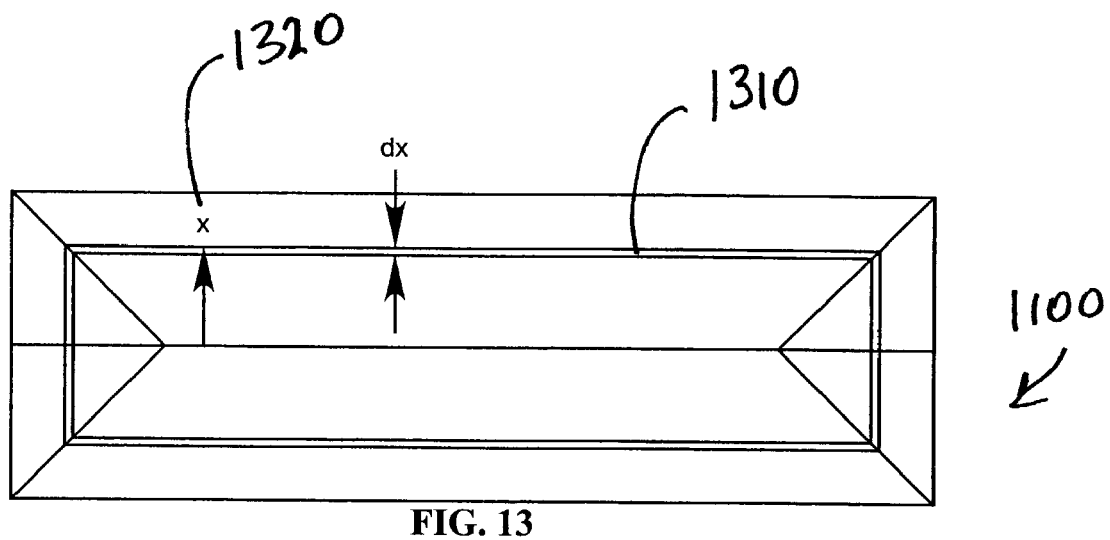
FIG. 13 shows the incremental current path of FIG. 12 in accordance with a preferred embodiment of the present invention.

Referring now to FIG. 12 the conductive path 1230 assumed on the mirror paddle 1200 (one side of mirror 1100 of FIG. 11) in accordance with the present invention is shown. Referring to FIG. 13 the mirror paddle 1200 is shown having an incremental current path 1310 parameterized by the variable x 1320 in accordance with a preferred embodiment of the present invention.

While generally not so in nature, it is assumed for ease of illustration that the current paths 1230 and 1310 are rectangular in rectangular mirror 1100. The actual current paths will likely be more elliptical, since the current will generally take the path of least resistance. Hence, the actual damping will be somewhat larger than that manifested infra.

The length of an incremental current path 1310 is described by the following equation (16) where x 1320 is the distance from the center line to the path 1310 as shown in FIG. 13:

Length of Path 1310=2(L−W)+8x          16.

The resistance of an incremental path 1310 is represented by equation (17) below with the conductive layer assumed to be copper:

$$17.\ R(x) = \frac{\rho_{Cu} Path}{t_{Cu} dx}$$

The voltage around the path is $V(x)=2x(L-W+2x)\dot{B}$. Hence the power dissipated in the incremental path is denoted by equation (18) below:

$$18.\ dP = \frac{V^2}{R} = \left[\frac{2\dot{B}^2 t_{Cu}}{\rho_{Cu}}\right]\left[\frac{x^2(L-W+2x)^2}{L-W+4x}\right]dx$$

The total power dissipated is found by equation (19) below:

$$19.\ P = \int_{x=0}^{W/2} dP$$

The net result for the magnetic damping coefficient is given by equation (20) below:

$$20.\ R_\theta = \frac{\dot{B}_\theta^2 t_{Cu}}{\rho_{Cu}}[Z(L,W)]$$

where $B_\theta$ is the θ derivative of the average magnetic field, and Z(L,W) below in equation (21) is the integral of the polynomial in equation (18).

$$21.\ Z(L, W) := \frac{1}{32} \cdot L^2 \cdot W^2 - \frac{1}{128} \cdot L \cdot W^3 - \frac{L^3 \cdot W}{128} +$$

$$\ln\left(\frac{L+W}{L-W}\right) \cdot \left[\frac{L^4}{256} - \frac{L^3 \cdot W}{64} + \left(\frac{3}{128} \cdot L^2 \cdot W^2\right) - \frac{L \cdot W^3}{64} + \frac{W^4}{256}\right]$$

The moment of inertia I of the paddle 1200 is given by equation (22) below:

$$22.\ I_{paddle} := \frac{W_{Si}}{3}\left[\left(L_{Si} + \frac{L_1}{2}\right)^3 - \left(\frac{L_1}{2}\right)^3\right] \cdot (2 \cdot \rho_{Si} \cdot t_{Si} + \rho_{Cu} \cdot t_{Cu} + \rho_{Au} \cdot t_{Au})$$

where the thicknesses and densities of silicon, copper and gold are indicated by t and ρ, and where $L_1$ 1160 is the gap in the middle of the paddle where the flexure attaches as shown referring back to FIG. 11. It should be noted that the damping layer and coils are assumed to be only on one end of the paddle to reduce mirror curvature.

The Q of the paddle is then given by equation (23) as follows:

$$23.\ Q_{paddle} := \frac{\omega_0 \cdot I_{paddle} \cdot \rho el_{Cu}}{Z(L_{Si}, W_{Si}) \cdot B_\theta^2 \cdot t_{Cu}}$$

Sample data and calculations for the mirror 1100 in accordance with the present invention are shown in TABLE 3 using the above formulas. Note, as mentioned supra, that the formula underestimates damping due to the assumption of rectangular current flow. The mechanical Q factor of this preferred embodiment of the present invention is in the range of 0.1 to 30 (unitless). As shown below in TABLE 3, the value for Q is 24 for the design as described above.

In accordance with another aspect of the preferred embodiment of the present invention, a column is added to TABLE 3 below labeled "Optimized for Q" representing a design which is still further optimized for damping. To optimize damping in this scenario, the ratio of L/W is kept small, the silicon thickness is minimized, the conductive layer is thickened, and a high value for $B_0$ is assumed. Using these values, results in a much-reduced Q value of 3.4 as shown in TABLE 3 below in the column labeled "Optimized for Q".

TABLE 3

Values utilized in calculating damping and the mechanical quality factor (Q) in accordance with a preferred embodiment of the present invention

| Variables | Units | Preferred Embodiment | Preferred Embodiment Optimized for Q | Ranges |
|---|---|---|---|---|
| $f_0$ | Hz | 80 | 80 | 10 Hz–10 kHz |
| 1310, $B_\theta$ | T/radian | 1 | 1.5 | 0.1–5 |
| 1370, $t_{Cu}$ | mm | 0.005 | 0.006 | 0.001–1.0 |
| $t_{Si}$ | mm | 0.03 | 0.01 | 0.001–1.0 |
| 1360, $L_1$ | mm | 0.24 | 0.05 | 0.050–2.0 |
| 1410, L | mm | 0.94 | 0.7 | 0.050–4.0 |
| 1420, W | mm | 0.5 | 0.4 | 0.005–1.0 |
| Q | None | 24 | 3.4 | 0.1–30 |

TABLE 3-continued

Values utilized in calculating damping and the mechanical quality factor (Q) in accordance with a preferred embodiment of the present invention In accordance with the above-described preferred embodiments of the present invention, there are several strategies for further increasing the magnetic damping and desirably decreasing the Q value. In accordance with the present invention one strategy is to reduce mirror mass and moment of inertia, primarily by thinning the silicon (Si). This strategy is limited by the requirement for flat mirrors. Moment of inertia varies linearly with the mass/unit area of the mirror. A silicon mirror thickness of 30 microns is usable in accordance with a preferred embodiment of the present invention, depending on radius of curvature requirements.

A second alternate strategy of reducing Q would be to increase the conductive copper (Cu) layer thickness. The layer thickness can be increased to 5 microns without severely complicating the fabrication process.

A third means for decreasing the Q factor would be to increase the magnetic flux density variation as a function of angle or $$\frac{\partial \phi}{\partial \theta}$$

since the Q factor varies inversely as the square of this quantity as depicted in Equation (15). Recently, monolithic magnet configurations with 50% higher $$\frac{\partial \phi}{\partial \theta}$$

have been fabricated. This can result in a 2.25 times reduction in the Q value.

A fourth means for increasing damping is to use a highly conductive material such as aluminum for the structural body of the mirror rather than silicon. In this way, the conductive layer is maximized without adding additional mass for a less conductive structural layer. Alloys of aluminum known in the art may also be employed to increase the yield strength of the aluminum mirrors.

In accordance with a preferred embodiment of the present invention, the net result of implementing the strategies described supra can be a Q of less than 2 as depicted in last column of the table as shown in TABLE 2. With additional active electronic damping or combined positive/negative pulse drive, strategies known in the art, settling time can be reduced further still and hence, the effective Q can be reduced still further.

The present invention and above preferred embodiments also describe the use of magnetic damping for reducing ringing and easing the burden on the control electronics for rapid switching. It should be noted that several methods of introducing a conductive layer on the mirror are known in the art and possible, such as electroplating, sputtering, evaporation, etc. on either side of the mirror. The preferred solution in accordance with the present invention is to add a layer of copper, silver, gold, tungsten, or aluminum. This layer is best kept off the flexures or hinges 1140 such that hysteresis is not added to the torsional flexures. This can be easily accomplished with one additional photolithography step before or after the coil photolithography steps or by using a shadow mask.

Having described various preferred embodiments of the present invention, it will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. A device for magnetic damping comprising:
   at least one conductive plate having a conductive layer, said plate rotating relative to an applied magnetic field wherein said conductive plate is a MEMS mirror.

2. The device of claim 1 wherein said mirror is round.

3. The device of claim 3 wherein the majority of said conductive plate is conductive.

4. The device of claim 3 wherein said conductive plate rotates around a pair of flexures that support said plate.

5. The device of claim 4 wherein a thickness of said mirror is in the range of 1 to 1000 microns.

6. The device of claim 5 wherein a radius of said mirror is in the range of 0.01 mm to 2.0 mm.

7. The device of claim 6 wherein said magnetic field is in the range of 0.1 Tesla to 1.5 Tesla.

8. The device of claim 7 wherein said conductive layer thickness is in the range of 1 micron to 1000 microns.

9. The device of claim 8 wherein a mechanical quality factor (Q) of said mirror is in the range of 0.1 to 30.

10. A device for magnetic damping comprising:
    a magnet producing a magnetic field; and
    at least one conductive plate rotating about two axes relative to said magnetic field wherein said at least one conductive plate is a MEMS mirror.

11. The device of claim 10 wherein said at least one conductive plate is a round mirror.

12. The device of claim 11 wherein said at least one conductive plate has a conductive layer.

13. The device of claim 12 wherein a majority of said at least one conductive plate is conductive.

14. The device of claim 12 wherein said magnet is a monolithic magnet with protruding nubs.

15. The device of claim 12 wherein said magnet is a monolithic magnet with filled holes.

16. The device of claim 12 wherein a thickness of said mirror is in the range of 1 to 1000 microns.

17. The device of claim 12 wherein a radius of said mirror is in the range of 0.01 mm to 2.00 mm.

18. The device of claim 12 wherein said magnetic field is in the range of 0.1 to 1.5 Tesla per meter.

19. The device of claim 12 wherein said conductive layer thickness is in the range of 1 to 1000 microns.

20. The device of claim 12 wherein a mechanical quality factor (Q) of said mirror is less than 2.

21. A device for magnetic damping comprising:
    a magnet producing a magnetic field; and
    at least one conductive plate having a conductive layer rotating about a single axis relative to said magnetic field wherein said at least one conductive plate is a MEMS mirror.

22. The device of claim 21 wherein said mirror has a rectangular shape.

23. The device of claim 22 wherein said mirror is a double-ended paddle mirror with actuation coils and hinges.

24. The device of claim 23 wherein a majority of said at least one conductive plate is conductive.

25. The device of claim 23 wherein said conductive layer has a thickness in the range of 0.001 mm to 1.0 mm.

26. The device of claim 25 wherein said conductive layer and actuation coils are on one end of said double-ended paddle.

27. The device of claim 26 wherein a thickness of said mirror is in the range of 0.001 mm to 1.0 mm.

28. The device of claim 27 wherein a length of said mirror is in the range of 0.05 mm to 4.00 mm.

29. The device of claim 28 wherein a width of said mirror is in the range of 0.005 mm to 1.00 mm.

30. The device of claim 29 wherein said magnetic field is in the range of 0.1 Tesla to 1.5 Tesla.

31. The device of claim 30 wherein a resulting mechanical quality factor (Q) of said mirror is in the range of 0.1 to 30.

32. A method for increasing magnetic damping of a MEMS rotational device comprising the steps of:
    placing a conductive layer on at least one conductive plate wherein said at least one conductive plate is a MEMS mirror; and
    applying a magnetic field to said at least one conductive plate, said at least one conductive plate rotating relative to said magnetic field.

33. The method of claim 32 wherein said conductive layer has a thickness in the range of 1 to 1000 microns.

34. The method of claim 33 wherein said conductive layer is comprised of copper.

35. The method of claim 33 wherein a majority of said at least one conductive plate is conductive.

36. The method of claim 32 wherein said mirror is round.

37. The method of claim 32 wherein said mirror is rectangular.

38. The method of claim 32 wherein said at least one conductive plate rotates about a single axis.

39. The method of claim 32 wherein said at least one conductive plate rotates about two axes.

40. The method of claim 35 wherein a resulting mechanical quality factor (Q) is in the range of 0.1 to 30.

* * * * *